H. J. FROST.
SNAP HOOK CONNECTING LINK.
APPLICATION FILED AUG. 5, 1915.
1,182,471.
Patented May 9, 1916.
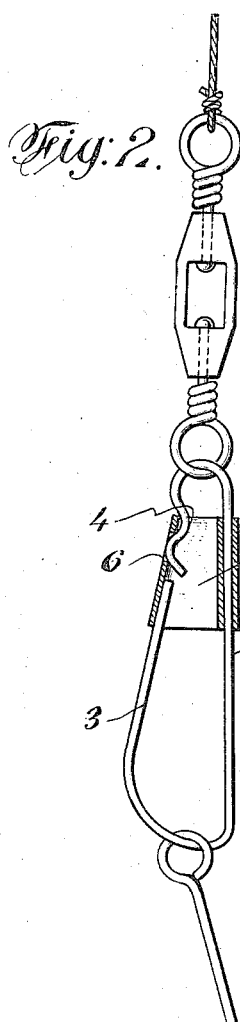
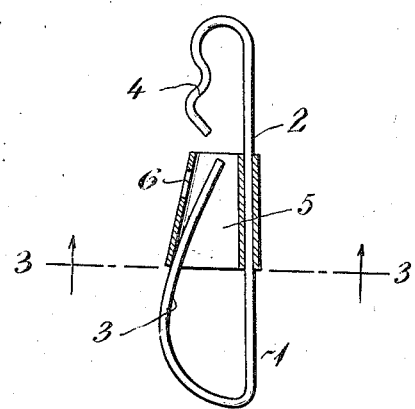
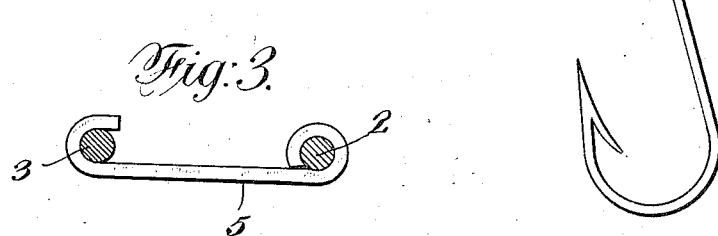
Inventor
Herbert J. Frost
By his Attorney

UNITED STATES PATENT OFFICE.

HERBERT J. FROST, OF GLEN RIDGE, NEW JERSEY.

SNAP-HOOK-CONNECTING LINK.

1,182,471. Specification of Letters Patent. Patented May 9, 1916.

Application filed August 5, 1915. Serial No. 43,712.

*To all whom it may concern:*

Be it known that I, HERBERT J. FROST, a citizen of the United States, and a resident of Glen Ridge, in the county of Essex and State of New Jersey, have invented certain new and useful Improvements in Snap-Hook-Connecting Links, of which the following is a specification.

The present invention relates to snap hook connecting links particularly of the kind utilized in connection with fish hooks. In devices of this kind it is customary to attach the fish hook to the snap hook and to connect a swivel or line or leader between the snap hook and the line.

The main object of this invention is to avoid the necessity of forming the snap hook connecting link on the swivel, leader or line during the process of manufacture, and to this end the construction is such that the snap hook connecting link may be attached to the swivel after it is made instead of during the process of manufacture as heretofore.

A further feature of the invention is to provide means whereby the parts may be locked together after they are assembled.

Other features of construction, combination of parts and arrangement of elements will appear as the specification proceeds.

In the accompanying drawing the invention is embodied in a concrete and preferred form.

In the said drawings: Figure 1 is a sectional view showing the snap hook connecting link in its open position. Fig. 2 is a view similar to Fig. 1 with the parts in their closed position, showing the snap hook connecting link and the swivel attached. Fig. 3 is a transverse sectional view on the line 3—3 of Fig. 1.

Similar characters of reference indicate corresponding parts in the several views.

1 indicates a strand of wire consisting of a main portion 2, a spring portion 3 and a resilient locking portion 4. The spring portion is formed by bending one end of the wire back upon the main portion, and the resilient locking portion is formed by bending the other end of said wire back upon the main portion.

5 indicates a tapered guard of sheet material having a sleeve at one edge by means of which the guard is pivotally and slidably mounted upon the main portion 2 and the spring portion 3 with its tapered end toward the resilient locking portion 4. This guard or keeper 5 is provided with an aperture 6 into which the resilient locking portion snaps to lock the parts and limit the sliding movement of the guide in one direction as shown in Fig. 2. The spring portion 3 is formed to closely fit the diverging end of the guard to limit the sliding movement of the guide 5 in the other direction as shown in Fig. 1.

When the parts are in the position shown in Fig. 1, the hook and the swivel may be readily inserted and locked in position.

The spring portion, or loop end 3, is bent abruptly back from the main wire portion, as a consequence of which, any pull exerted on the hook will take place in alinement with the main portion 2 thereby overcoming the tendency of the free end of the loop 3 to be pulled from its place in the guard 5. Also the latching engagement of the other loop 4 with the aperture 6 in the guard member 5 will prevent the pulling of the free end of the loop 4 from the converging end of the guard.

What is claimed, is:

1. A snap hook connecting link comprising: a strand of wire consisting of a main portion, a spring portion and a resilient locking portion, the spring portion being formed of one end of the wire bent back upon the main portion, and the resilient locking portion being formed of the other end of said wire bent back upon the main portion, a tapered guard of sheet material, slidingly mounted on said main and spring portions and pivotally mounted on said main portion with its tapered end toward the resilient locking portion, said guard being provided with an aperture into which the resilient locking portion snaps to limit the sliding movement of the guard in one direction, the spring portion closely engaging the diverging end of said guard to thereby limit the movement of the guard in the other direction.

2. A snap hook connecting link comprising: a strand of wire consisting of a main portion, a spring portion and a resilient locking portion, the spring portion consisting of a return bend in the wire at one end of the main portion and the resilient locking portion consisting of a return bend in the wire at the other end of the main portion, a guard of sheet material having a sleeve at one edge by means of which said guard is pivotally and slidably mounted on said main wire portion, and a return bend near the opposite edge of said guard forming a recess into which both the spring portion and the resilient locking portion of said link can be removably secured.

3. A detachable link comprising: a strand of wire having a return bend at each end, a lateral projection formed on one of the end portions, a guard having a sleeve at one edge by means of which said guard is pivotally and slidably mounted on said wire, an overhanging bend near the opposite edge of said guard forming a recess into which both the end portions of said wire can be secured, and a recess near one end of said overhanging bend with which the lateral projection on one of said end portions engages.

4. A snap hook connecting link comprising: a strand of wire consisting of a main portion and resilient end loops, a tapered guard of sheet material having a sleeve at one edge by means of which said guard is pivotally mounted on said main wire portion, and an overhanging bend at the opposite edge of said guard forming a recess into which both end loops can be removably secured, said loop at the converging end of said tapered guard having a hump which prevents movement of said guard member toward said loop end, and said other loop end fitting the diverging end of said guard to thereby frictionally resist movement of said guard toward said other loop end.

5. An attaching link comprising: a main portion and end loops, a guard of sheet material slidingly mounted on said link and pivotally mounted on said main portion and having a recess for holding the ends of said loops, one of said loops being formed with a catch to engage said guard to prevent said loop from being pulled out of engagement with said guard, and said other loop being curved abruptly back at a point contiguous said main wire portion, whereby a pull on said loop will be applied in alinement with said main portion to lessen the tendency to pull the free end of said last named loop from said guard.

Signed at New York city, in the county of New York and State of New York this 3rd day of July A. D. 1915.

HERBERT J. FROST.

Witnesses:
   G. H. RAYMOND,
   TERESA V. LYNCH.